(12) United States Patent
Paul et al.

(10) Patent No.: US 9,183,421 B2
(45) Date of Patent: Nov. 10, 2015

(54) CHECKING ARRANGEMENT FOR VALUE-DOCUMENT CHECK

(75) Inventors: Elisabeth Paul, Raubling (DE); Jurgen Schutzmann, Pfaffenhofen (DE)

(73) Assignee: GIESECKE & DEVRIENT GMBH, Munich (DE)

(*) Notice: Subject to any disclaimer, the term of this patent is extended or adjusted under 35 U.S.C. 154(b) by 0 days.

(21) Appl. No.: 14/237,383

(22) PCT Filed: Aug. 8, 2012

(86) PCT No.: PCT/EP2012/003384
§ 371 (c)(1),
(2), (4) Date: Feb. 6, 2014

(87) PCT Pub. No.: WO2013/020702
PCT Pub. Date: Feb. 14, 2013

(65) Prior Publication Data
US 2014/0191035 A1  Jul. 10, 2014

(30) Foreign Application Priority Data

Aug. 10, 2011 (DE) .......................... 10 2011 109 949

(51) Int. Cl.
G06K 7/08 (2006.01)
H01F 13/00 (2006.01)
G07D 7/04 (2006.01)

(52) U.S. Cl.
CPC *G06K 7/087* (2013.01); *G07D 7/04* (2013.01); *H01F 13/00* (2013.01)

(58) Field of Classification Search
CPC ........... H01F 13/00; G06K 7/08; G01N 27/00
USPC .......................................... 235/450; 361/143
See application file for complete search history.

(56) References Cited

U.S. PATENT DOCUMENTS 5,420,742 A * 5/1995 Ketcham et al. ............... 361/151
5,715,080 A * 2/1998 Scerbak ......................... 359/281
(Continued)

FOREIGN PATENT DOCUMENTS

| DE | 102004049999 A1 | 4/2006 |
| DE | 102008061507 A1 | 6/2010 |
| DE | 102011106263 A1 | 12/2011 |

OTHER PUBLICATIONS

Search Report from German Application No. 10 2011 109 949.6, Mar. 23, 2012.
(Continued)

*Primary Examiner* — Christle I Marshall
(74) *Attorney, Agent, or Firm* — Workman Nydegger

(57) ABSTRACT

A testing configuration for testing a security document includes a security element, having a high-coercivity magnetic material and a low-coercivity magnetic material, a device comprising such a test configuration and to a relevant test method. The high- and low- coercivity magnetic materials of the security element are magnetized in a first direction by the interaction of first and second magnet pair units, and subsequently the low-coercivity magnetic material is remagnetized in a second magnetization direction by means of the second magnet pair unit. The magnet pair units are arranged with respect to one another in such a closely adjacent manner along the transport path of the security document that the first magnet field strength is greater than the magnet field strength provided by the first magnet pair unit alone and is greater than the magnet field strength provided by the second magnet pair unit alone.

14 Claims, 3 Drawing Sheets

(56) References Cited

U.S. PATENT DOCUMENTS

| | | |
|---|---|---|
| 8,387,879 B2 | 3/2013 | Schutzmann et al. |
| 8,544,630 B2 * | 10/2013 | Schutzmann et al. ........ 194/302 |
| 8,544,893 B2 | 10/2013 | Schutzmann et al. |
| 2008/0111544 A1 | 5/2008 | Patland et al. |
| 2009/0008922 A1 * | 1/2009 | Schutzmann et al. .......... 283/67 |
| 2011/0233277 A1 | 9/2011 | Schutzmann et al. |
| 2013/0082105 A1 * | 4/2013 | Schutzmann et al. ........ 235/450 |

OTHER PUBLICATIONS

International Search Report for corresponding International PCT Application No. PCT/EP2012/003384, mailed Nov. 5, 2012.

* cited by examiner

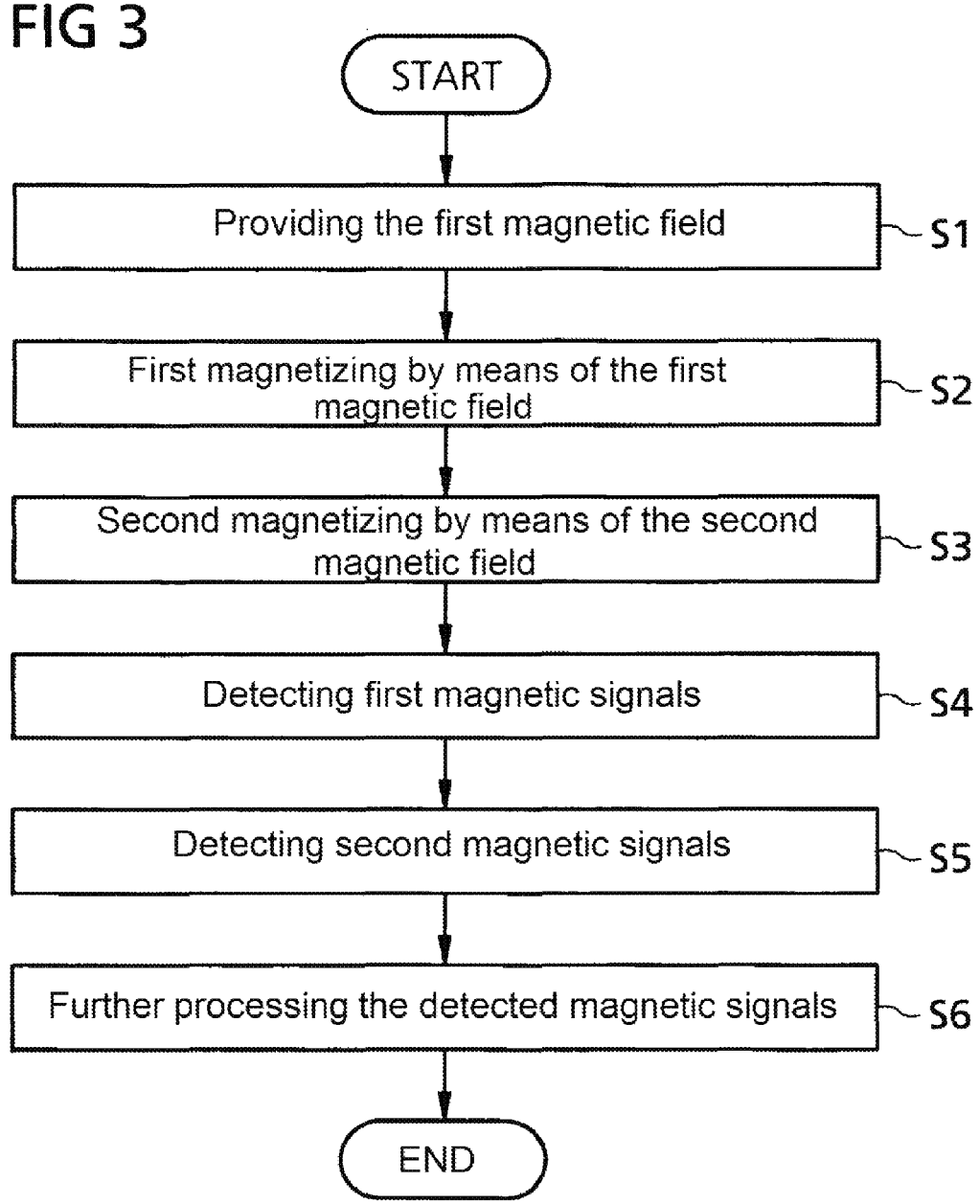

CHECKING ARRANGEMENT FOR VALUE-DOCUMENT CHECK

BACKGROUND

The present invention relates to a checking arrangement for checking a value document having a security element, to a corresponding checking method for the value-document check as well as to an apparatus having such a checking arrangement for processing value documents.

SUMMARY

Value documents within the meaning of the present invention are e.g. bank notes, checks, cards, tickets, coupons or the like. For producing or improving the forgery resistance of such value documents it is known to equip these with security elements, such as e.g. security strips or security threads, which contain magnetic or magnetizable materials with different coercive field strengths. A certain, characteristic sequence of magnetic and non-magnetic regions may serve as the magnetic coding of a security element. For example, from magnetic materials having different coercive field strengths, high-coercive and low-coercive magnetic regions can be formed on the security element, the arrangement of which represents a characteristic and machine-checkable coding of the value document. Upon the machine check such security elements are subjected to magnetic fields of different strengths, in order to, for example, align the high-coercive magnetic regions into a first magnetization direction and the low-coercive magnetic regions into a second magnetization direction deviating therefrom. With a suitable detector device the various magnetization directions can then be recognized and the coding be checked in this way.

In usual checking arrangements the value documents to be checked are transported, before the detection of magnetic signals, past magnets for magnetizing the value document or the security element. To avoid transport malfunctions of the value documents, in many checking arrangements there is provided a comparatively large distance between the magnets used for magnetizing and the value document to be checked. There results the problem that with large distances between the value document and the magnets, despite the use of strong magnets, hardly a sufficient magnetic field strength for magnetizing the high-coercive magnetic regions can be provided.

The invention is hence based on the object of providing in a simple way a sufficient magnetic field strength for magnetizing high-coercive magnetic regions of a security element without having to diminish the distances between the magnets and the value documents to be checked and to thus increase the risk of jams of the value-document transport.

This object is achieved by a checking arrangement, a checking method, and an apparatus having the features of the independent claims. In claims dependent thereon, advantageous embodiments and developments of the invention are stated.

The checking arrangement according to the invention comprises along a transport path in the transport direction of the value document a magnetization device for magnetizing the security element and a detector device for the detection of magnetic signals that emanate from the magnetized security element. For magnetizing the magnetic materials, the magnetization device comprises along the transport path in the transport direction a first and a second magnet-pair device that respectively comprise magnets arranged on both sides of the transport path.

The detector device for the detection of magnetic signals of the security element is arranged after the magnetization device, regarded along the transport path, i.e. after the two magnet-pair devices, in order to record magnetic signals of the security element after this has been magnetized by the two magnet-pair devices.

According to the invention, the magnetization device provides a first magnetic field of a first magnetic field strength through the interaction of the first and the second magnet-pair device in a first section along the transport path of the value document, which magnetic field strength both is greater than the magnetic field strength provided in the first section by the first magnet-pair device alone and than the magnetic field strength provided in the first section by the second magnet-pair device alone. Here, the magnetic field strength provided by the first or second magnet-pair device alone designates the magnetic field strength that the first or second magnet-pair device would generate in the first section, when the second or first magnet-pair device would not be present, with the positions of the first or second magnet-pair device relative to the first section remaining unchanged in this consideration. The first and second magnet-pair devices are arranged in such a way that the first section, regarded along the transport path, is provided between the first and the second magnet-pair device.

The checking arrangement is in particular adapted to check a value document having a security element that comprises a high-coercive magnetic material of a first coercive field strength and, where applicable, a low-coercive magnetic material of a second coercive field strength. Through the interaction of the first and the second magnet-pair device the magnetization device provides a first magnetic field that possesses a first magnetic field strength which is greater than the first coercive field strength of the high-coercive magnetic material. With the first magnetic field the high-coercive and the low-coercive magnetic materials are aligned, within the framework of a first magnetization process, into a first magnetization direction. The first magnetic field extends preferably parallel to the transport plane of the value document, in which the value document is transported past the magnetization device, e.g. parallel or anti-parallel to the transport direction or also obliquely thereto.

In addition, the second magnet-pair device provides in a second section along the transport path of the value document a second magnetic field that possesses a second magnetic field strength that is smaller than the first coercive field strength of the high-coercive magnetic material and greater than the second coercive field strength of the low-coercive magnetic material. The second magnetic field strength, due to the influence of the first magnet-pair device, can be reduced in comparison to the magnetic field strength provided by the second magnet-pair device in the second section alone. With the second magnetic field, whose magnetic field strength is lower than that of the first magnetic field, only the low-coercive magnetic material is aligned, within the framework of a subsequent second magnetization process, into a magnetization direction different from the first magnetization direction, e.g. into a magnetization direction oriented antiparallel to the first magnetization direction. The magnetization direction of the high-coercive magnetic material is not changed by the second magnetic field. The second magnetization direction extends preferably parallel to the transport plane of the value document, e.g. antiparallel to the first magnetization direction.

In this way, clearly distinguishable magnetic signals of the high- and the low-coercive magnetic regions can be captured with the detector device. From these magnetic signals the spatial arrangement of the high-coercive and low-coercive magnetic regions in the security element can then be determined, for example by an additional evaluation device as a component of the checking arrangement, and starting out therefrom a coding of the security element be checked.

Accordingly, a checking method according to the invention comprises the steps of magnetizing the security element and detecting the resulting magnetic signals, for magnetizing a first and a second magnetic field being provided. The magnetic field strength of the first magnetic field is here greater than the first coercive field strength of the high-coercive material and the magnetic field strength of the second magnetic field is smaller than the coercive field strength of the high-coercive magnetic material, but greater than the coercive field strength of the low-coercive material. Within the framework of the first magnetization process then the high-coercive and the low-coercive magnetic materials are first aligned into the first magnetization direction by the first, stronger magnetic field and subsequently within the framework of the second magnetization process only the low-coercive magnetic material is aligned into a second magnetization direction by the second, weaker magnetic field.

While the first, stronger magnetic field is provided through interaction of the first and the second magnet-pair device, the second, weaker magnetic field is provided substantially only by the second magnet-pair device. According to the invention, the second magnet-pair device is thus not only employed for providing the second magnetic field determined for magnetizing the low-coercive magnetic material, but also for providing the first magnetic field through interaction with the first magnet-pair device, which first magnetic field is greater than the first coercive field strength and thus sufficiently strong to reliably magnetize the high-coercive magnetic material into the desired magnetization direction.

The present invention thus provides, through interaction of the two magnet-pair devices, a sufficiently strong first magnetic field, whose field strength is greater than the field strength of such a magnetic field that can be provided by the first magnet-pair device alone—i.e. without interaction with the second magnet-pair device. There can thus be provided two magnetic fields differing in their strength and direction, which offer the necessary magnetic field strengths for selectively magnetizing the high-coercive and the low-coercive magnetic material, without the distance between the opposing magnets and thus the distance to the value documents guided through between the magnets having to be reduced.

An apparatus according to the invention is designed for processing value documents, in particular as a sorting apparatus for checking and sorting value documents, as a bank note deposit and/or dispensing device, as a bank note checking device or the like, and comprises the above-described checking arrangement as well as further component groups for processing value documents. For example, a transport system for transporting the value documents as well as value document input pockets and output pockets and the above-mentioned evaluation device can be provided as a further component group of the apparatus.

Preferably, the first and the second magnet-pair device respectively comprise only one single magnet pair with magnets that are mutually opposing with regard to the transport path. Here, according to a preferred embodiment, the first magnet-pair device comprises first magnets that are arranged in such a way on opposing sides of the transport path that their magnetic poles of a first polarity are facing each other (and the transport path) and their magnetic poles of the polarity inverse thereto are facing away from each other (and from the transport path). Moreover, the second magnet-pair device comprises, according to this preferred embodiment, second magnets lying on opposing sides of the transport path, whose magnetic poles of a second polarity inverse to the first polarity are facing each other (and the transport path) and whose magnetic poles with a polarity inverse thereto are facing away from each other (and from the transport path). Through the interaction of these magnet-pair devices, the magnetization device can provide the first, stronger magnetic field necessary for magnetizing the high-coercive magnetic regions.

In the checking arrangement of the invention no detection device for detecting magnetic signals is arranged within the region of influence of the magnetization device, in particular between the opposing magnets of the two magnet-pair devices. In the checking arrangement of the invention the detection device is arranged downstream of the magnetization device along the transport path of the value documents.

As described hereinabove, through interaction of the two magnet-pair devices a first magnetic field strength can be achieved, which is greater than the magnetic field strength achievable by the first magnet-pair device alone. For this purpose, the two magnet-pair devices are designed and arranged in the checking device relative to each other in such a way that the generated magnetic field strengths in the first section add to the first, stronger magnetic field strength. Preferably, the arrangement of the magnet-pair devices is such that the first magnetic field strength, compared to the magnetic field strength provided by the first magnet-pair device alone in the first section, is increased by at least 5% and particularly preferably by at least 10%.

The magnetization device provides the first magnetic field strength preferably between the first and the second magnet-pair device, regarded along the transport path. Through the interaction of the two magnet-pair devices, exactly there a particularly high first magnetic field strength acts on the magnetic materials in the security element. Moreover, the two magnet-pair devices are arranged relative to the transport path preferably in such a way that the first magnetization direction extends in the transport plane of the value documents transported through the checking arrangement, e.g. substantially parallel or antiparallel to the transport direction. Other diametrically opposite magnetization directions are also possible, however.

The individual magnetic field strengths and their ratio to each other are mutually coordinated in particular by the distance $\Delta x$, which lies between the magnets of the first and of the second magnet-pair device along the transport path of the value document. Preferably, this distance is larger than zero ($\Delta x > 0$ mm), so that the magnets of the two magnet-pair devices do not border on each other directly. Furthermore, the distance is preferably smaller than or equal to 30 mm ($\Delta x \leq 30$ mm), preferably smaller than or equal to 10 mm ($\Delta x \leq 10$ mm). By a distance of $\Delta x > 0$ mm, in particular of at least $\Delta x = 0.5$ mm, it is achieved in the preferably employed magnets that the second magnetic field strength remains sufficiently great in order to align the low-coercive material into the second magnetization direction. Because with a distance of $\Delta x = 0$ the field strength of the second magnetic field could be reduced too strongly for certain low-coercive magnetic materials. A distance of $\Delta x \leq 30$ mm, in contrast, permits a sufficiently great first magnetic field strength, and $\Delta x \leq 10$ mm a particularly great first magnetic field strength.

Furthermore, the distance $\Delta z$, which the two magnets of the first and the second magnet-pair device are respectively spaced apart in the direction perpendicular to the transport plane of the value document, has, among other things, an influence on the two magnetic field strengths and their spatial variation. By a comparatively large distance of $\Delta z \geq 2$ mm, preferably of $\Delta z \geq 5$ mm, particularly preferably of $\Delta z \geq 8$ mm, it can be achieved that on or near the transport path a section of the first magnetic field extending in the perpendicular (z)-direction is provided, in which the first magnetic field is homogeneous, i.e. in which the direction and strength of the magnetic field is substantially constant. This is advantageous because in this homogeneous section of the first magnetic field the magnetic materials are magnetized always substantially in the same direction, e.g. always in such a way that the magnetization leading out of the transport plane of the value document, e.g. extending perpendicular to the value-document plane is very low. Thus, transport-related fluttering movements of a value document (in the direction perpendicular to the value-document plane) lead to only minor variations in the magnetization direction of the magnetic materials. The extension of the homogeneous section of the first magnetic field in the direction perpendicular to the transport direction for this purpose amounts to at least 0.5 mm, preferably at least 1 mm.

Through the interaction of the magnet-pair devices, in particular through the above-mentioned distances Δx and Δz, it is achieved that in the first section of the first magnetic field a component oriented perpendicular to the transport plane of the value document that might be present in the first magnetic field has no more than 10% of the magnetic field strength of that component of the first magnetic field that is oriented parallel to the transport plane of the value document. That is, a magnetic-field component $H_z$ pointing in the z direction, that might be present in the first section of the first magnetic field, amounts to no more than 10% of the magnetic field strength $H_x$ in the x direction at the same place. This makes it possible to ensure that the actual magnetization direction of the magnetic materials largely corresponds to the desired first magnetization direction (x).

Through the above-described suitable relative arrangement of the first and second magnet-pair device relative to each other, moreover, the ratio between the first magnetic field strength and the second magnetic field strength can be exactly coordinated, so that this ratio lies for example between 3:1 and 15:1. This permits the high-coercive and low-coercive magnetic materials employed in security elements to be selectively magnetized and reliably evaluated.

According to a preferred embodiment, the detector device comprises, regarded along the transport path, a first magnetic detector for detecting first magnetic signals of the security element and a second magnetic detector for detecting second magnetic signals of the security element. For example, here a further magnetic field provided by a further magnetization device acts on the security element before the detection of the second magnetic signals.

By employing the further magnetic field before the detection of the second magnetic signals, these differ additionally from the detected first magnetic signals, so that there results a further information source with respect to the spatial arrangement of the high-coercive and low-coercive magnetic materials in the security element and this can be reproduced more reliable. This makes it possible that also combined regions of the security element can be reliably captured, which have both high-coercive and low-coercive magnetic materials.

BRIEF DESCRIPTION OF THE DRAWINGS

Further features and advantages of the invention will result from the following description of the embodiment examples of the invention as well as further alternative embodiments in connection with the drawings, which show schematically:

FIG. 3 a method for checking value documents.

DETAILED DESCRIPTION OF VARIOUS EMBODIMENTS

Figure 1:
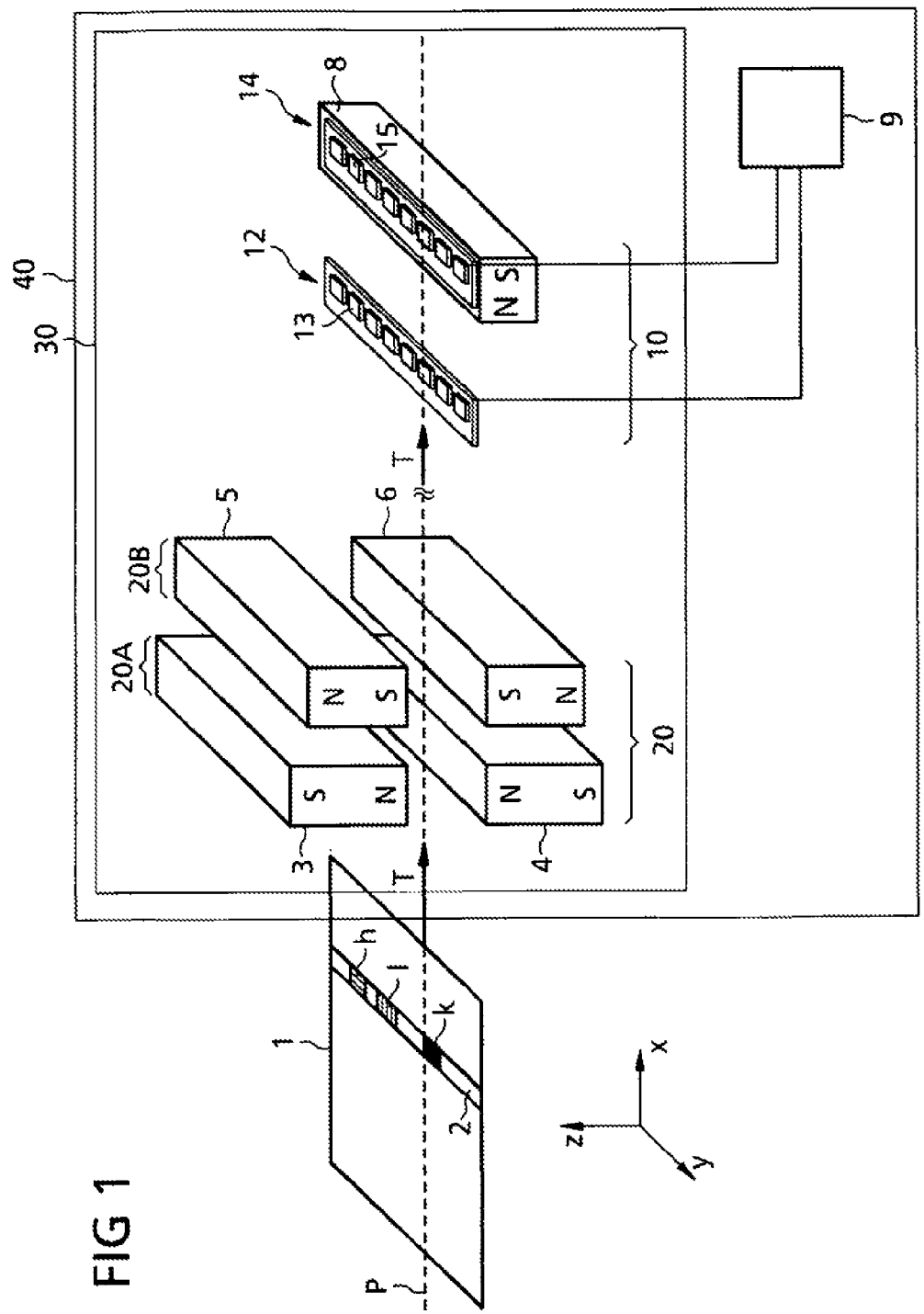
FIG. 1 an apparatus for checking value documents, comprising a checking arrangement of the invention having magnetization device and detector device.

FIG. 1 shows a preferred embodiment of an apparatus 40 for checking and processing value documents 1 furnished with a security element 2, e.g. bank notes, coupons, checks or other sheet-shaped value documents. For checking the value document 1 the apparatus comprises a checking arrangement 30 comprising a magnetization device 20 and a detector device 10 as well as an evaluation device 9 for evaluating magnetic signals detected by the detector device 10. The checking arrangement is e.g. employed for checking the authenticity and/or the type of the value document 1. The apparatus 40 can possess also further component groups (not shown) or components that are necessary for value-document processing, for example transport mechanisms, which suitably guide a value document 1 to be checked through the checking arrangement 30 along a transport path P in a transport direction T, display and operating devices, input and output pockets as well as, where applicable, temporary storages for storing the checked value documents 1.

In addition to the magnetization device 20 and detector device 10 represented in FIG. 1, also the checking arrangement 30 can comprise further component groups or components. According to an alternative embodiment, the evaluation device 9 can also be component of the checking arrangement 30. In any case, however, the evaluation device 9 is connected with the detector device 10 for receiving the measurement results to be evaluated.

For checking, the value document 1 in the checking arrangement 30 is first guided along the transport path P through the magnetization device 20, is magnetized according to the invention there and then guided past the detector device 10 that detects magnetic signals in dependence on the magnetization of the security element 2. The checking arrangement 30 of FIG. 1 is described hereinafter in connection with the checking method outlined in FIG. 3.

The value document 1 has a security element 2 having a magnetic coding. In FIG. 1 the security element 2 is configured by way of example as a security thread. But, however, also arbitrary other forms of the security element 2 are conceivable, e.g. security strips, areal applications of magnetic lacquer, magnetic printing ink or the like. The security element 2 according to FIG. 1, represented by way of example, comprises high-coercive magnetic regions h, in which a high-coercive magnetic material is arranged, low-coercive magnetic regions l, in which a low-coercive magnetic material is arranged, and combined magnetic regions k, in which both the high-coercive magnetic material and the low-coercive magnetic materials are arranged. For example, a combined magnetic region k can comprise the two magnetic materials arranged one over the other or as a mixture. Generally, however, arbitrary security elements 2 based on magnets can be checked with the present invention, e.g. also those that comprise only high-coercive magnetic regions h or only low-coercive magnetic regions l. The magnetic regions h, k, l can be present on the security element 2 in principle arbitrarily often and arbitrarily arranged, for example also in transport direction T one behind the other or distributed arbitrarily two-dimensionally on the value document.

The magnetization device 20 comprises a first magnet pair 20A with at least the magnets 3 and 4 and a second magnet pair 20B with at least the magnets 5 and 6. Further details with respect to the magnetic fields $M_1$ and $M_2$ generated thereby are described hereinafter in connection with FIG. 2. In the magnetization device 20 the north poles N of the magnets 3 and 4 and the south poles S of the magnets 5 and 6 are arranged along the transport path P facing each other. Likewise, however, also the south poles S of the magnets 3, 4 and the north poles N of the magnets 5, 6 may face each other.

According to the embodiment of FIG. 1, the two magnet pairs 20A, 20B are arranged along the transport path P (in x direction) in a lateral distance $\Delta x$ that is larger than 0 mm and smaller than or equal to 30 mm. The distance $\Delta z$ of the magnets 3 and 4 of the magnet pair 20A or of the magnets 5 and 6 of the magnet pair 20B over the transport path P (i.e. in z direction) amounts to some mm. This achieves in the first section lying between the magnets 3, 4 and 5, 6 a first magnetic field pointing exactly, if possible, in the x direction, which has a vanishing or as low field strength as possible in the z direction. Preferably, the opposing magnets 3, 4 or 5, 6 of the magnet pairs 20A or 20B, respectively, are identical.

To guarantee that the magnetic field $M_1$ formed by the magnet pair 20A is stronger than the magnetic field $M_2$ formed by the magnet pair 20B, the magnets 5, 6 of the magnet pair 20B are weaker than the magnets 3, 4 of the magnet pair 20A. Alternatively, the magnets 3, 4, 5, 6 can all have the same strength, when the magnets 5, 6 of the second magnet pair 20B have a larger distance $\Delta z$ than the magnets 3, 4 of the first magnet pair 20A. For example, the magnets 3, 4 of the first magnet pair 20A have a strength (remanence) of Br=1.43 T and the magnets 5, 6 of the second magnet pair 20B a strength (remanence) of Br=1 T. The magnets preferably contain NdFeB or consist thereof. Alternatively, also electromagnets can be employed, however.

Figure 2:
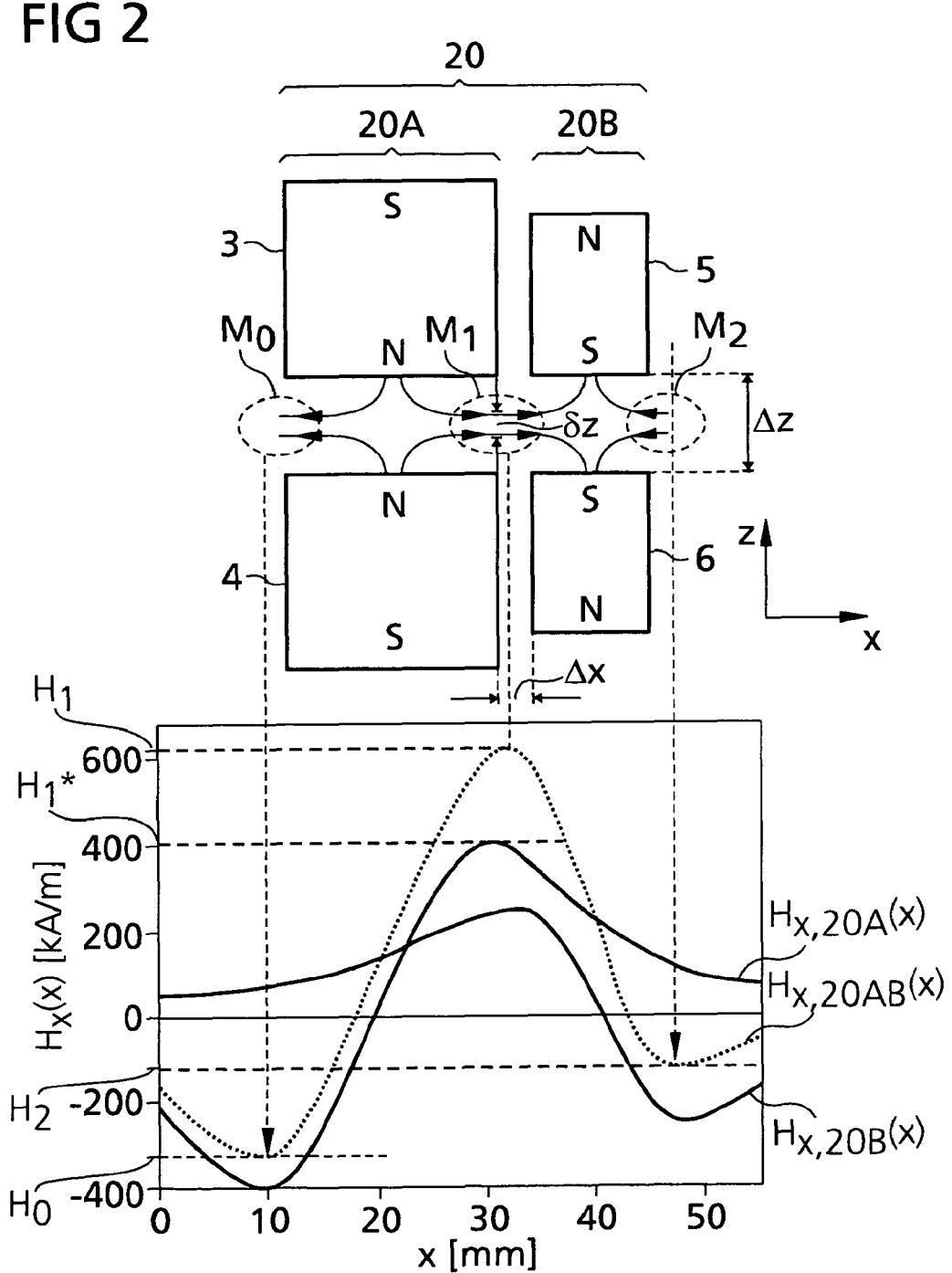
FIG. 2 the magnetization device consisting of two magnet pairs as well as the fields strengths generated by these.

The graph in the lower part of FIG. 2 shows the x component $H_{x,20A}(x)$ of the magnetic field strength generated exclusively by the first magnet pair 20A as a function of the position x along the transport path P extending between the magnets 3, 4 or 5, 6. For comparison, the x component $H_{X20B}(x)$ of the magnetic field strength generated exclusively by the second magnet pair 20B and the x component of the magnetic field strength $H_{x,20AB}(x)$ generated by interaction of the first and the second magnet pair 20A, 20B are represented.

By interaction of the magnet pairs 20A and 20B the first magnetic field $M_1$ of the first magnetic field strength $H_1$ is provided in the first section that lies between the magnet pairs 20A and 20B in FIG. 2, cf. step S1 of the checking method according to FIG. 3. This results in the field strength $H_1$ of the magnetic field $M_1$ by the magnetic field strengths $H_{x,20A,2oA}(x)$ and $H_{x,20B}(x)$ adding. The individual magnet pairs 20A and 20B respectively alone would not be able to provide such a high field strength. Rather, the field strength $H_1$ is more than 10% greater than a maximum field strength $H_1^*$ generatable by the first magnet pair 20A alone. In this way, in the first section, despite the relatively large distance $\Delta z$ between the magnets 3 and 4 or 5 and 6, a high first magnetic field strength $H_1$ is achievable, which is in particular greater than the coercive field strength of the high-coercive material. For this purpose, the distance $\Delta x$ is chosen sufficiently small, preferably smaller than or equal to 30 mm.

The high magnetic field strength $H_1$ of the first magnetic field $M_1$ is necessary to magnetize and suitably align the high-coercive magnetic material of the magnetic regions h and k in step S2. In so doing, also the low-coercive material in the magnetic regions k and l is magnetized, so that in step S2 all the magnetic regions h, k, l are magnetized and uniformly aligned. Since the field lines of the first magnetic field $M_1$ extend substantially in the x direction, the magnetic regions h, k, l are aligned, upon the magnetization according to step S2, in the x direction, i.e. parallel to the transport direction T of the value document 1 along the transport path P.

In so doing, within the first section of the first magnetic field $M_1$ a substantially homogeneous magnetic field is formed, in which the magnetic field lines extend substantially in the x direction, i.e. parallel to the transport direction T. In the first section of the first magnetic field $M_1$, in which in the x direction there is present the field strength $H_1$, the magnetic field strength in the z direction amounts to no more than 10% of the magnetic field strength in the x direction. The first section of the magnetic field $M_1$ possesses a size that ensures that the magnetic regions h, l, k of the value document 1 are actually aligned as desired substantially in the x direction. Extension and strength of the homogeneous magnetic field and its homogeneity can be optimized by a comparatively large distance $\Delta z$ and a small distance $\Delta x$.

In order to prevent possible fluttering movements of a value document 1 transported through between the magnets 3 and 4 or 5 and 6 in the transport direction T (i.e. in the x direction) in the z direction from leading to excessive deviations of the actual magnetization direction of the magnetic regions h, k, l from the desired, ideal magnetization direction, the homogeneous section of the first magnetic field $M_1$ has an extension $\delta z$ (extension in the z direction) of at least 0.5 mm to 1 mm. Depending on the application and type of the value documents 1 to be checked it can also be expedient to provide a homogeneous region of an extension $\delta z \geq 1$ mm. A large extension $\delta z$ of the homogeneous region is achieved in particular in the magnets 3, 4 or 5, 6 of the magnet pairs 20A, 20B being arranged in a relatively large distance $\Delta z$, for example of at least 5 mm.

Regarded in the transport direction T, after the first magnetic field $M_1$ a second magnetic field $M_2$ with a second magnetic field strength $H_2$ is produced. The magnet pairs 20A, 20B of the magnetization device 20 are designed in such a way in view of the parameters discussed above, that the second magnetic field $M_2$, in comparison to the first magnetic field $M_1$, is oriented in an opposite, antiparallel direction and has a lower second magnetic field strength $H_2 < H_1$. Here, the second magnetic field possesses a strength $H_2$, by which in step S3 only the low-coercive magnetic material arranged in the low-coercive magnetic regions l as well as in the combined magnetic regions k are magnetically reversed, but not the high-coercive magnetic material arranged in the high-coercive magnetic regions and (also) in the combined magnetic regions k. In order for the second magnetic field $M_2$ to achieve a magnetic field strength $H_2$ sufficient herefor, according to the embodiment of FIGS. 1 and 2 a distance of $\Delta x > 0$ between the magnet pairs 20A and 20B is provided. This distance is achieved e.g. by small distance plates by which the magnets 3 and 5 or 4 and 6 are interconnected, the thickness thereof preferably amounting to at least 0.5 mm.

For the above-described selective magnetizing of the high-coercive and low-coercive magnetic materials typically employed in practice, also the ratio $H_1:H_2$ of the two magnetic field strengths $H_1$ and $H_2$ in the x direction is to be chosen suitably. Such a ratio can be produced by a suitable arrangement and design of the magnet pairs 20A and 20B, in particular by a suitable distance $\Delta x$. Desired and practically expedient ratios $H_1:H_2$ of the two magnetic field strengths lie between 3:1 and 15:1. The field strength $H_1$ of the first magnetic field $M_1$ is preferably greater than or equal to 300 kA/m and can amount to e.g. up to 1,000 kA/m. The magnetic field strength $H_2$ of the second magnetic field $M_2$ normally amounts to at least 50 kA/m.

Upon magnetizing the high-coercive magnetic material it is necessary that the magnetic field strength $H_1$ of the first magnetic field $M_1$ is greater than the coercive field strength of this material. Ideally, the magnetic field strength $H_1$ is greater by at least the factor of 1.5 than the coercive field strength of the high-coercive magnetic material. The same ratio also applies to the magnetic field strength $H_2$ and the coercive field strength of the low-coercive magnetic material.

Through the checking arrangement 30, along the transport path P there arises, moreover, a magnetic field $M_0$ before the first magnetic field $M_1$, regarded in the transport direction of the value document 1. The magnetic field strength $H_0$ of the magnetic field $M_0$ may assume significant values, which can be sufficient at least for magnetizing the low-coercive magnetic regions h. However, because the clearly stronger first magnetic field $M_1$ follows on the magnetic field $M_0$ along the transport path P, any magnetization of the respective magnetic regions k, l by the magnetic field $M_0$ is cancelled by the clearly stronger magnetic field $M_1$ by all the magnetic regions h, k, l being aligned into the desired first magnetization direction. The magnetic field $M_0$ caused by the structure of the magnetization arrangement 20 thus does not affect the magnetic signals to be detected by the detector device 10 in the steps S4 and S5.

In the checking arrangement 30 the detector device 10 is arranged after the magnetization device 20 in the transport direction T. In the region of the magnetization device 20, e.g. between the magnet pairs 20A, 20B, however, no magnetic detector is located, because in the region of the magnetization devices the value documents are exclusively magnetized, but not detected as to their magnetic signals there. The detector device 10 comprises a first detector row 12 having magneto-sensitive elements 13, with which first magnetic signals are detected in the step S4. With a second detector row 14 having magneto-sensitive elements 15 second magnetic signals are detected in the step S5. Departing from FIG. 1, the detector rows 12, 14 can also be arranged obliquely to the transport direction T to achieve a higher local resolution. Likewise, instead of the detector rows 12, 14 for detecting the magnetic signals there can also be respectively employed only one individual, wide magneto-sensitive element, or one or few single tracks of a magneto-sensitive element 13 and a magneto-sensitive element 15, respectively, to capture and evaluate the magnetization only in the corresponding tracks.

Before the step S5 for detecting the second magnetic signals, a further magnetic field generated by a further magnetization device 8 can act on the security element 2 of the value document 1, which e.g. can be oriented parallel to the transport direction. The further magnetic field can act on the security element 2 also during the detection step S5 as in the arrangement of FIG. 1.

The ascertained first and second magnetic signals are finally evaluated in step S6 by the evaluation device 9, in order to determine the spatial arrangement of the high-coercive, the low-coercive and the combined magnetic regions h, l, k and to derive therefrom a statement about the authenticity and/or the type of the value document 1.

With respect to the combined magnetic regions k, which comprise both low-coercive and high-coercive magnetic materials, magnetizing is carried out by the magnetization device 20 in such a way that the magnetization of the combined magnetic regions k, which results from the magnetizing by the first, stronger and parallel-oriented magnetic field $M_1$ and the second, weaker and antiparallel-oriented magnetic field $M_2$, amounts to approximately zero. This is achieved in particular by a suitable choice of the high- and of the low-coercive magnetic materials and the surface densities of these materials in the combined magnetic regions k. In particular, it is expedient here that both magnetic materials have at least approximatively the same remanent flux density and are applied with the same surface density in the combined magnetic regions k.

Upon the detection of the first magnetic signals in step S4, by means of the first detector row 12 capturing magnetizations in a magnetization direction parallel to the transport direction T first magnetic signals are detected, which represent the spatial arrangement of the high-coercive magnetic regions h and of the low-coercive magnetic regions l on the security element 2 particularly well. The combined magnetic regions k, however, cause almost no magnetic signals there.

Alternative to the embodiment of the detector device according to FIG. 1, detector designs are also possible, in which the arrangement of the magnetic regions h, k, l can be determined already on the basis of the first magnetic signals obtained by means of the first detector row 12. For example, the surface density of the two magnetic materials in the combined magnetic regions k as well as the first and the second magnetic field strength $M_1$, $M_2$ can be chosen to be different.

In the embodiment example according to FIGS. 1 and 2, the arrangement of the combined magnetic regions k on the security element 2, however, is determined on the basis of the second magnetic signals measured by means of the second detector row 14. In order for the second detector row 14, which can be identical to the first detector row 12, to capture second magnetic signals distinguishable from the first magnetic signals, the further magnetization device 8 is provided for generating a further magnetic field. This is configured in such a way that the further magnetic field acting on the security element 2 before the detection of the second magnetic signals magnetically reverses the low-coercive magnetic material from the negative into the positive x direction, but not the high-coercive magnetic material that has already been aligned in the positive x direction.

Through the magnetic reversal of the low-coercive magnetic material into the x direction, this does no longer equalize the magnetizations of the high-coercive magnetic material in the x direction in the combined magnetic regions k, so that there a clear magnetization component remains in the x direction. This permits the second detector row 14 to capture, in addition to the second magnetic signals emanating from the high-coercive magnetic regions h, also clear second magnetic signals emanating from the combined magnetic regions k. In combination, the first and second magnetic signals then allow the exact localization of the magnetic regions h, k, l on the security element 2 by the evaluation device 9.

Alternatively, it is possible that the further magnetic field aligns the low-coercive magnetic material—in particular also in the combined magnetic regions k—into the z direction, so that clear second magnetic signals emanating from the combined regions k can be determined in step S5. Furthermore, a further magnetic field can be employed that is so strong that also the high-coercive magnetic material is magnetically reversed, which can likewise lead to a well detectable magnetic signal of the combined regions.

The invention claimed is:

1. A checking arrangement adapted to check a value document having a security element when the value document moves along a transport path having a first section, the security element having a high-coercive magnetic region of a first coercive field strength, the checking arrangement comprising:

a first magnetization device for magnetizing the security element, the first magnetization device comprising a first magnet-pair device and a second magnet-pair device along the transport path;

a detector device for the detection of magnetic signals that emanate from the security element, the detector device comprising a first magnetic detector and a second magnetic detector for respectively detecting first and second magnetic signals of the security element; and a second magnetization device for providing a further magnetic field to act on the security element after detection of the first magnetic signal and before or concurrent with detection of the second magnetic signal, the detector device and the second magnetization device being positioned after the first and second magnet-pair devices along the transport path;

wherein the first and second magnet-pair devices respectively produce first and second magnetic fields having first and second magnetic field strengths, the first and second magnet-pair devices being arranged along the transport path adjacent to each other such that a composite magnetic field occurs at the first section along the transport path due to interaction between the first and second magnetic fields, the composite magnetic field having a composite magnetic field strength which is greater than either of the first or second magnetic field strength, and wherein the composite magnetic field strength is greater than the first coercive field strength such that the high-coercive magnetic region of the security element is magnetized when the security element is at the first section of the transport path.

2. The checking arrangement according to claim 1, wherein the composite magnetic field strength is greater by at least 5% than either of the first or second magnetic field strengths.

3. The checking arrangement according to claim 1, wherein the transport path has a second section, which is arranged after the first section and before the detector device and the second magnetization device along the transport path, and wherein the second magnetic field strength at the second section of the transport path is smaller than the composite magnetic field strength, and wherein the second magnetic field is oriented antiparallel to the composite magnetic field.

4. The checking arrangement according to claim 3, wherein the first and second magnet-pair devices are configured and arranged in such a way that the ratio between the composite magnetic field strength and the second magnetic field strength lies between 3:1 and 15:1.

5. The checking arrangement according to claim 1, wherein
the first magnet-pair device comprises first and second magnets arranged on opposing sides of the transport path such that the magnetic poles of the first and second magnets of a first polarity are facing each other; and
the second magnet-pair device comprises third and fourth magnets arranged on opposing sides of the transport path such that the magnetic poles of the third and fourth magnets of a second polarity inverse to the first polarity are facing each other.

6. The checking arrangement according to claim 5, wherein the distance that the first magnets of the first magnet-pair device and the second magnets of the second magnet-pair device are respectively spaced apart in the direction perpendicular to the transport plane of the value document amounts to at least 2 mm.

7. The checking arrangement according to claim 1, wherein the distance between the first magnet-pair device and the second magnet-pair device along the transport path is smaller than or equal to 30 mm.

8. The checking arrangement according to claim 1, wherein the distance between the first magnet-pair device and the second magnet-pair device along the transport path is larger than zero.

9. The checking arrangement according to claim 1, wherein the first and second magnet-pair devices are configured and arranged in such a way that the direction of the composite magnetic field extends substantially parallel to the transport plane of the value document, substantially parallel or antiparallel to the transport direction of the value document along the transport path.

10. The checking arrangement according to claim 1, wherein the first and second magnet-pair devices are configured and arranged in such a way that in the first section the component of the first magnetic field that is oriented in a direction perpendicular to the transport plane of the value document amounts to no more than 10% of that component of the first magnetic field that is oriented parallel to the transport plane of the value document.

11. The checking arrangement according to claim 1, wherein
the checking arrangement is configured for checking a security element that comprises a high-coercive magnetic material of a first coercive field strength and, where applicable, a low-coercive magnetic material of a second coercive field strength; and
the magnetization device is adapted to provide, through the interaction of the first magnet-pair device and the second magnet-pair device, the first magnetic field having a first magnetic field strength which is greater than the first coercive field strength, and to provide the second magnetic field having a second magnetic field strength that is smaller than the first coercive field strength and is greater than the second coercive field strength.

12. A checking method for checking a value document along a transport path using a magnetization device, the transport path having first and second sections, the value document having a security element, the security element having a high-coercive magnetic material of a first coercive field strength and a low-coercive magnetic material of a second coercive field strength, the magnetization device comprising a first magnet-pair device and a second magnet-pair device that respectively produce first and second magnetic fields having first and second magnetic field strengths, the first and second magnet-pair devices being arranged along the transport path adjacent to each such that a composite magnetic field occurs at the first section due to interaction between the first and second magnetic fields, the composite magnetic field having a composite magnetic field strength that is greater than either of the first or second magnetic field strength, the method comprising:

moving the value document along the transport path so as to pass the first and second sections so that:
at the first section, magnetizing of the security element by the composite magnetic field occurs such that the high-coercive magnetic material and the low-coercive magnetic material become aligned in a first magnetization direction; and
at the second section, magnetizing of the security element by the second magnetic field of the second magnet-pair device occurs such that the low-coercive magnetic material becomes aligned into a second magnetization direction, wherein the second magnetic field has a second magnetic field strength that is smaller than the first coercive field strength and greater than the second coercive field strength;

detecting first magnetic signals that emanate from the security element after the security element has been magnetized at the first and second sections;

after the detection of the first magnetic signals, applying a further magnetic field to the security element to magnetically reverse the low-coercive magnetic material; and after or concurrent with the application of the further magnetic field, detecting second magnetic signals that emanate from the security element.

13. The checking method according to claim 12, wherein the composite magnetic field strength is greater by at least 5% than the first magnetic field strength alone.

14. An apparatus comprising a checking arrangement according to claim 1, wherein the apparatus is configured as a value document processing apparatus for checking value documents.

* * * * *